(12) United States Patent
Gweon et al.

(10) Patent No.: US 7,439,483 B2
(45) Date of Patent: Oct. 21, 2008

(54) REAL-TIME CONFOCAL MICROSCOPE USING THE DISPERSION OPTICS

(75) Inventors: Dae Gab Gweon, Daejeon (KR); Dong Kyun Kang, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 214 days.

(21) Appl. No.: 11/405,226

(22) Filed: Apr. 17, 2006

(65) Prior Publication Data
US 2007/0241266 A1    Oct. 18, 2007

(51) Int. Cl.
*H01J 3/14* (2006.01)
*G02B 21/00* (2006.01)
(52) U.S. Cl. .................. 250/216; 359/368; 250/201.3
(58) Field of Classification Search ............ 250/216, 250/201.3; 359/235, 368, 385, 389
See application file for complete search history.

(56) References Cited

U.S. PATENT DOCUMENTS 5,067,805 A    11/1991    Corle et al.

2007/0121196 A1*    5/2007    Tearney et al. ............ 359/333

* cited by examiner

*Primary Examiner*—Thanh X Luu
(74) *Attorney, Agent, or Firm*—Patterson, Thuente, Skaar & Christensen, P.A.

(57) ABSTRACT

Disclosed is a real time confocal microscope using a dispersion optics comprising: a broad band light source for supplying light; an illumination optics for illuminating onto a slit aperture by collecting the light emitted from the light source; the slit aperture for only passing a region of the slit among the light illuminated from the illuminating optics; a tube lens for making the lights passing through the slit aperture to be parallel lights; a first dispersion optics for making the parallel lights emitted from the tube lens propagate in different angles according to wavelengths; an objective lens for illuminating the lights emitted from the first dispersion optics on a specimen; a first image formation lens for making the lights reflected from the specimen and passing through the slit aperture 805 to be parallel lights; a second dispersion optics for making the parallel lights emitted from the first image formation lens propagate in different angles according to wavelengths; a second image formation lens for image forming the lights emitted from the second image formation optics; and a two dimensional photoelectric detector for converting the lights emitted from the second image formation lens into an electric signal.

7 Claims, 15 Drawing Sheets

Prior Art

Prior Art

Prior Art

Prior Art

Prior Art

Prior Art

REAL-TIME CONFOCAL MICROSCOPE USING THE DISPERSION OPTICS

FIELD OF THE INVENTION

The invention relates to a real-time confocal microscope using the dispersion optics for obtaining an image in real time while settling problems of vibration, signal processing, light loss, and production cost occurring from the installation of a scanning device, by constructing the confocal microscope without the scanning device.

BACKGROUND OF THE RELATED ART

The real-time confocal microscope using the dispersion optics of the present invention can be applied to inspections requiring a high speed such as an inspection of defects in a semiconductor wafer, and an inspection of defects in an LCD, and the like.

Conventionally, the confocal scanning microscope has been widely used in observing objects in the field of biomedical science. Further, it has advantages that it is possible to observe an inside shape of a specimen as the depth discrimination in the direction of the optical axis is good, and to obtain a three dimensional shape of the object. Also, the confocal scanning microscope has been widely applied to the measurement and inspection of the semiconductor wafer, a flat panel display device, and micro patterns, and the like, because it has a high resolution in the horizontal direction in comparison with the conventional optical microscope.

FIG. 1 is a schematic view of the confocal scanning microscope using a conventional Nipkow disk. As shown in the drawing, the conventional microscope is composed of a light source 1, a collimation lens 2, a beam splitter 3, a Nipkow disk 4, a motor 5, a tube lens 6, an objective lens 7, a specimen 8, a first lens 9, a second lens 10, and a two dimensional photoelectric detector 11.

In this conventional confocal microscope, the light emitted from the light source 1 passes through the collimation lens 2 to become parallel lights. The parallel lights are reflected at the beam splitter 3 to illuminate an upper surface of the Nipkow disk 4.

In this instance, a shape of the Nipkow disk 4 is shown in FIG. 2. FIG. 2 shows a shape of the disk on which a plurality of pinhole shaped small apertures 4a are distributed. When the parallel beams illuminate the disk, only lights passing through the plurality of apertures within an illuminating region can propagate toward the tube lens 6. The lights passing through the respective aperture in the illuminating region can diverge with various angles due to a diffraction phenomenon to produce effects identical with those of arranging a point light source at the position of the aperture.

The tube lens 6 and the objective lens 7 form the image of the aperture on the specimen 8 to produce effect as was produced when the plurality of point regions are only illuminated among the observation regions of the specimen. In order to illuminate whole observation regions of the specimen, it is necessary to change the position of the aperture. In this regard, the apertures 4a on the disk are made to move by the movement of the rotation shaft of the motor 5 after mounting the Nipkow disk 4 to the motor 5.

Accordingly, the light reflected from an illuminating portion on the specimen 8 passes through the objective lens 7 and the tube lens 6 to thereby form an image on the Nipkow disk 4. In this instance, if the specimen 8 is positioned on the focal plane of the objective lens 7, the reflected light passes through the aperture on the Nipkow disk 4, however, if the specimen 8 gets out of the focal plane to move to the direction of optical axis, the reflected light cannot pass through the aperture. As a result, the confocal effect can be obtained, and it is possible to obtain a high resolution in the direction of the optical axis.

Further, the light passed through the aperture forms an image on the two dimensional photoelectric detector 11 by means of the first lens 9 and the second lens 10. The position of the point formed on the photoelectric detector 11 is changed according to the driving rotation of the motor 5 so that the light signal can be transferred to whole region of the two dimensional photoelectric detector to make it possible to obtain a two dimensional information of the specimen.

FIG. 3 shows a different shape of the Nipkow disk. The disk shown in FIG. 3 is provided with a curved aperture 4b on the surface thereof. In case of using such aperture, the region through which the illuminating light passes is formed in a line shape, and accordingly, the region illuminated on the specimen by the objective lens is also formed into a line shape. As the driving rotation of the motor 5 performed, the line illuminating the specimen is moved, and the line formed on the two dimensional photoelectric detector 11 is also moved to make it possible to obtain the two dimensional shape of the specimen.

According to a confocal scanning microscope using a rotation disk, it has an advantage that it is possible to obtain higher image acquisition speed in comparison with a beam deflection confocal scanning microscope, which obtains the image in serial manner using a beam deflector. The limitation of the measuring speed is decided by the image acquisition speed of the two dimensional photoelectric detector, and it is general to acquire images at a rate of thirty frames per second. However, according to the recent improvement of the image acquisition speed of the two dimensional photoelectric detector, the confocal scanning microscope capable of obtaining a thousand frames per second has been realized.

However, it has a defect that the resolution in the direction of the optical axis is decreased because a plurality of points instead of one point or a wide region on the specimen should be illuminated in order to process the parallel signals.

FIG. 4 shows such effect by drawing it. When the specimen 8 is positioned on the focal plane of the objective lens 7, the light reflected from the specimen is accurately collected on the aperture by the tube lens 6 to thereby make a great amount of the lights pass through the aperture as shown in (a) of FIG. 4. In this case, the collected reflected light does not affect the neighboring apertures.

However, when the specimen is gotten away of the focal plane of the objective lens 7, the light collected by the tube lens 6 cannot be accurately collected on the aperture from which the illuminating light has been emitted, and it is collected on a position moved toward the direction of the optical axis. In such case, the reflected light passes through the aperture from which the illuminating light is emitted as well as the neighboring apertures to reduce the enhancing effect of the resolution in the direction of the optical axis according to the confocal principle.

FIG. 5 shows the change of the resolution in the direction of the optical axis according to the increase of the size of the aperture with respect to the confocal scanning microscope using a single aperture and the confocal scanning microscope using multiple apertures. It is necessary to increase the size of the aperture to obtain a measurable great amount of light. However, as shown in FIG. 5, in case of the confocal scanning microscope using the multiple apertures, it is shown that a value of the resolution in the direction of the optical axis can be increased to reduce the capability of the microscope according to the increase of the size of the aperture.

Thus, in case of the confocal scanning microscope using the conventional rotation disk, the entering light reflected at the specimen from the light illuminated at the neighboring apertures acts as a kind of noise to reduce the capability of the microscope in the direction of the optical axis.

Another problem of the conventional technology is a vibration and sampling. It is necessary to prepare the rotating motor to rotate the Nipkow disk, however, it can cause the problem of vibration in the whole optic system. Also, in case of using the two-dimensional photoelectric detector having a high image acquisition speed, a distortion of the image can be produced because the rotation speed of the Nipkow disk is not sufficient.

FIG. 6 is a schematic view of a conventional confocal scanning microscope. As shown in the drawing, the conventional confocal scanning microscope 10 comprises a light source 12, a beam space filtering/expanding device 14, a beam splitter 16, a scanning device 18, an objective lens 20, a collecting lens 22, an aperture shaped as a pinhole, and a photoelectric detector 26.

In the conventional confocal scanning microscope, the light emitted from the light source 12 passes through the beam space filtering/expanding device 14 to become parallel lights, and the parallel lights are reflected at the beam splitter 16 to enter into the scanning device 18. Then the parallel lights, the propagating direction of which is changed by the scanning device, are collected on the specimen 8 by the objective lens 20. The fluorescent light or light reflected from the specimen 20 passes through the objective lens 20, the scanning device 18, and the beam splitter 16, and then is collected on the pinhole shaped aperture 24 by the light collecting lens 22. In this instance, the lights reflected or made to be fluorescent at the focal plane of the objective lens 20 among the lights reflected or made to be fluorescent at the specimen 8 form a focus on the pinhole shaped aperture 24 and are measured by the photoelectric detector 26 after they pass through the aperture. The lights reflected or made to be fluorescent at a region without the focal plane form a focus before or after the pinhole shaped aperture so that a great portion of the lights cannot pass through the pinhole shaped apertures to thereby decrease the intensity of the lights measured at the photoelectric detector. It is possible to observe the inside organ of the object because information emitted from the focal plane of the objective lens 20 can be obtained by using such principle. Also, the resolution in the horizontal direction can be improved, because lights emitted from a point remote from the focus can be filtered by the pinhole shaped aperture although they are on the focal plane.

However, there is a problem that the confocal scanning microscope 10 using the pinhole shaped aperture 24 requires a lot of time to obtain one two dimensional image due to the limitation of the scanning speed of the scanning device 18. High measuring speed can be sometimes obtained to settle such problem by using an accousto-optic deflector in the scanning device, however, in such a case, it causes a defect that a great calculation load is applied to the processing of the signal and a computer is required requisitely.

FIG. 7 is a schematic view of a confocal microscope spectrally encoded at one direction of the two dimensional plane of the specimen by using a diffraction grating. As shown in the drawing, the conventional microscope comprises a optic fiber 71, a lens 72, a diffraction grating 73, and a specimen 74.

In such a structure, the lens 72 collects the light emitted from the dismal end of the optic fiber 71. In this instance, the light emitted from the optic fiber 71 becomes to use a broad band light source having various wavelengths. Because the diffraction grating 73 differs in the propagating angle of a first-order beam according to the wavelength of the light, each light having a wavelength 1, a wavelength 2, and a wavelength 3 are met at points on the specimen different from each other, as shown in the drawing. In this instance, lights reflected at the specimen passes through the diffraction grating 72 and the lens 73 again to thereby be collected at the dismal end of the optic fiber 71, and the collected lights are transferred to the other end of the optic fiber. Thus, because lights of different wavelengths and the coordinates on the specimen can be matched in one direction on the specimen plane, it is advantageous that scanning is not required in the matched direction.

However, it is necessary to deflect the lights in the direction which is not matched by transporting the dismal end of the optic fiber in the direction vertical to the matched direction (a direction vertical to the ground in FIG. 7), or by mounting a beam deflector between the optic fiber 71 and the diffraction grating 73 so as to acquire all the two dimensional images of the specimen.

Thus, when a transporting portion is to be mounted, vibration of the system can be produced according to the movement of the transporting portion to decrease the reliability of the measurement. Further, a piece of information is obtained in the matched direction, and the beam is moved in a direction vertical to the matched direction with receiving signals in series and performing them so that a lot of time is required to process the signals to thereby decrease the image acquisition speed. Also, the used beam deflector or the transporting device for the optic fiber is high cost to become a primary factor of increasing the production cost.

SUMMARY OF THE INVENTION

Therefore, the present invention has been made in view of the above problems occurring in the prior art, and it is an object of the present invention to provide a real-time confocal microscope using the dispersion optics for obtaining a two dimensional sectional image of an object in real time while settling problems of vibration, signal processing, and increase of the production cost of the detector, and the like occurring from the installation of a scanning device, by constructing the confocal microscope without the scanning device.

To accomplish the above object, according to the present invention, there is provided a real time confocal microscope using a dispersion optics comprising a broad band light source for supplying the light; an illumination optics for illuminating onto a slit aperture by collecting the light emitted from the light source; the slit aperture for only passing a region of the slit among the lights illuminated from the illuminating optics; a tube lens for making the lights passing through the slit aperture to be parallel lights; a first dispersion optics for making the parallel lights emitted from the tube lens propagate in different angles according to wavelengths; an objective lens for illuminating the lights emitted from the first dispersion optics on a specimen; a first image formation lens for making the lights reflected from the specimen and passing through the slit aperture to be parallel lights; a second dispersion optics for making the parallel lights emitted from the first image formation lens propagate in different angles according to wavelengths; a second image formation lens for image forming the lights emitted from the second image formation optics; and a two dimensional photoelectric detector for converting the lights emitted from the second image formation lens into an electric signal.

Also, according to the present invention, the first and second dispersion optics can be formed of a prism.

Further, according to the present invention, the first and second dispersion optics can be formed of a diffraction grating.

In addition, according to the present invention, the real time confocal microscope can further comprise: a first polarizing plate arranged between the broad band light source and the illuminating optics; a waveplate arranged between the first dispersion optics and the objective lens; a second polarizing plate arranged between the first image formation lens and the second dispersion optics; and a polarizing beam splitter for diverging the lights illuminated from the illuminating optics into the slit aperture and the image formation lens respectively.

Also, according to the present invention, the illuminating optics can be formed of a cylindrical lens.

Further, according to the present invention, the illuminating optics can comprise a cylindrical lens for collecting the lights; an illuminating lens for making the slit patterns collected by the cylindrical lens parallel lights; and an image formation lens for collecting the parallel lights emitted from the illuminating lens on the slit aperture.

In addition, according to the present invention, the microscope can further comprise a second slit aperture arranged between the cylindrical lens and the illuminating lens for filtering the lights collected by the cylindrical lens.

BRIEF DESCRIPTION OF THE DRAWINGS

The following drawings appended to the specification illustrate the preferred embodiments of the present invention, and act to make the technical spirit of the present invention be understood together with the following detailed description of the invention, and hence, the present invention should not be construed to be limited to those items shown in the drawings, in which.

DETAILED DESCRIPTION OF THE PREFERRED EMBODIMENT

Reference will now made in detail to the preferred embodiment of the present invention with reference to the attached drawings.

Figure 1:
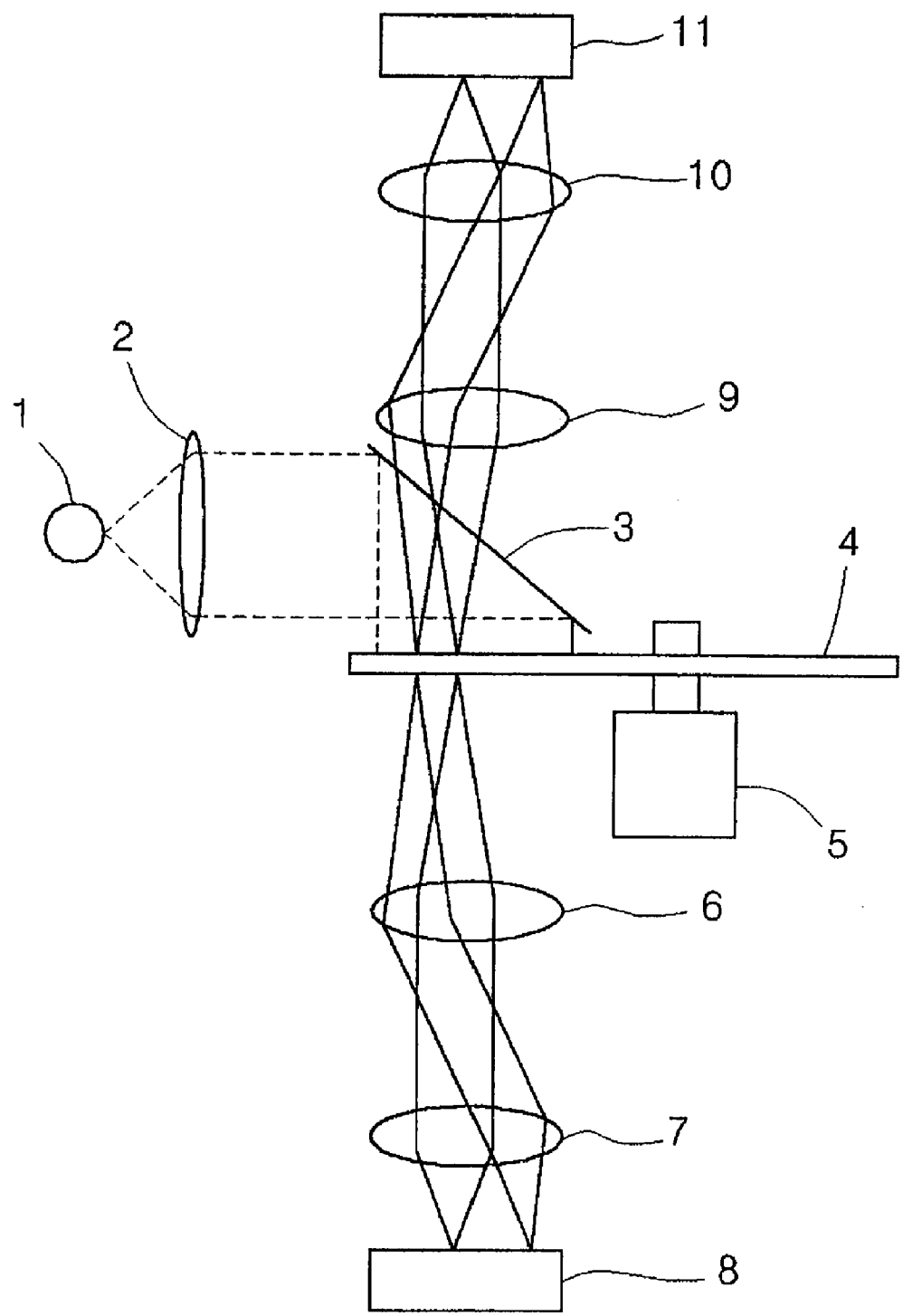
FIG. 1 is a schematic view of a conventional confocal scanning microscope using a rotation disk.
Figure 2:
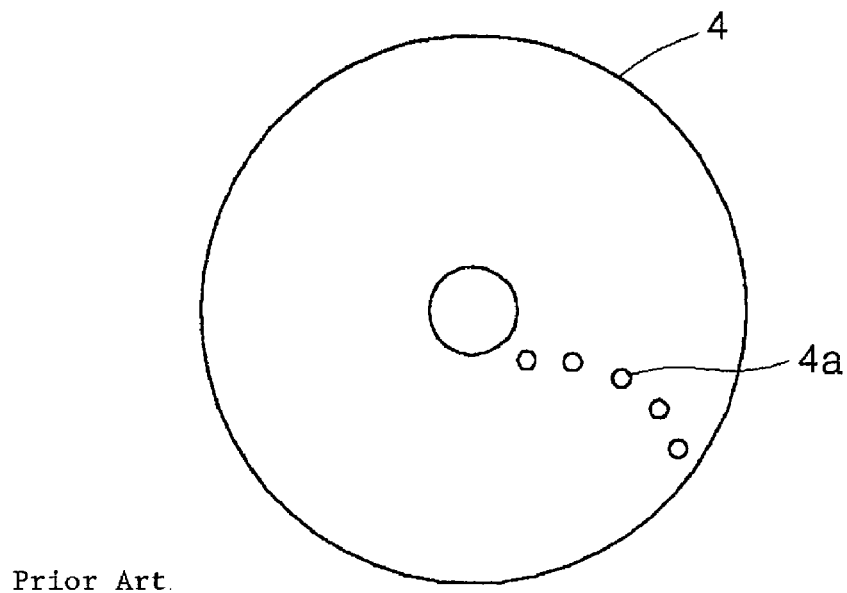
FIG. 2 is a schematic view of a rotation disk formed with multiple pinhole apertures.
Figure 3:
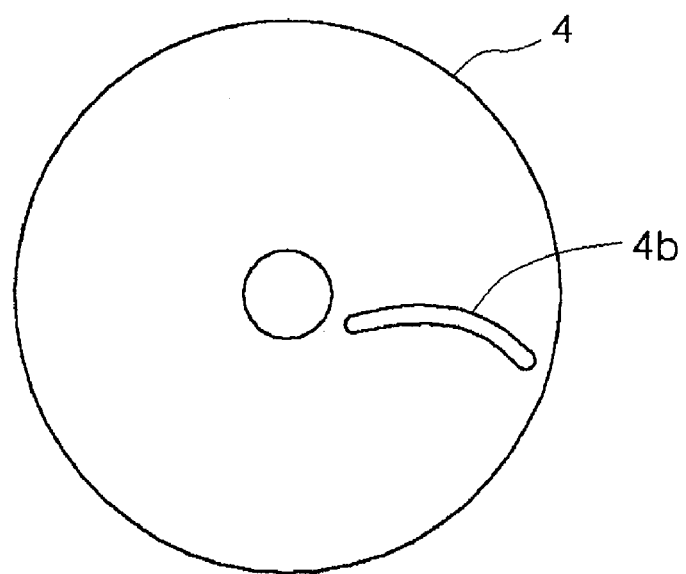
FIG. 3 is a schematic view of a rotation disk formed with a slit pinhole aperture.
Figure 4:
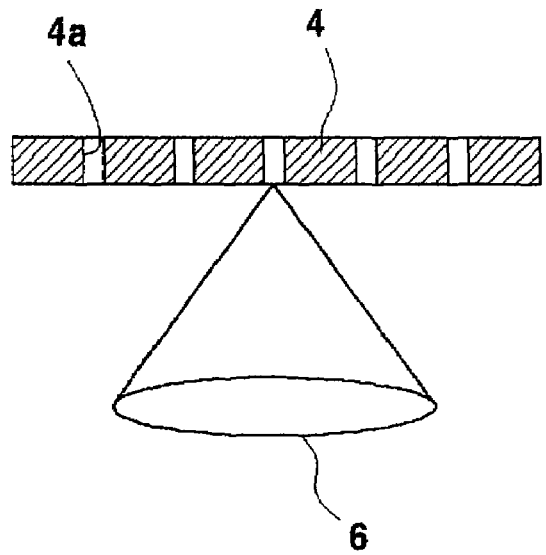
FIG. 4 is a view for showing an affect of the reflected light collected at a tube lens according to the movement of a specimen in the optical axis direction in the confocal scanning microscope using the multiple apertures.
Figure 4:
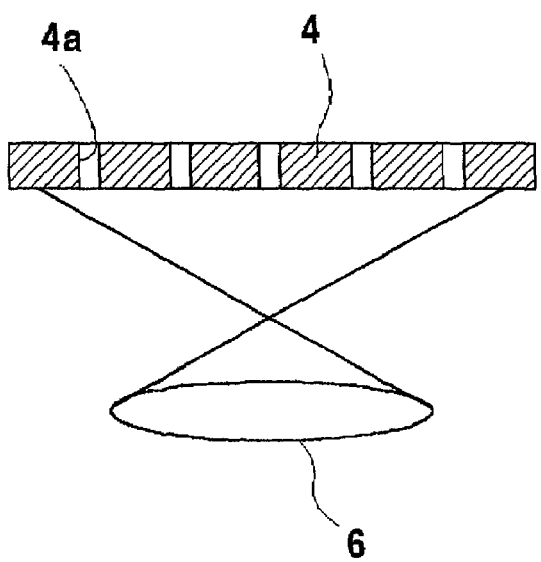
Figure 5:
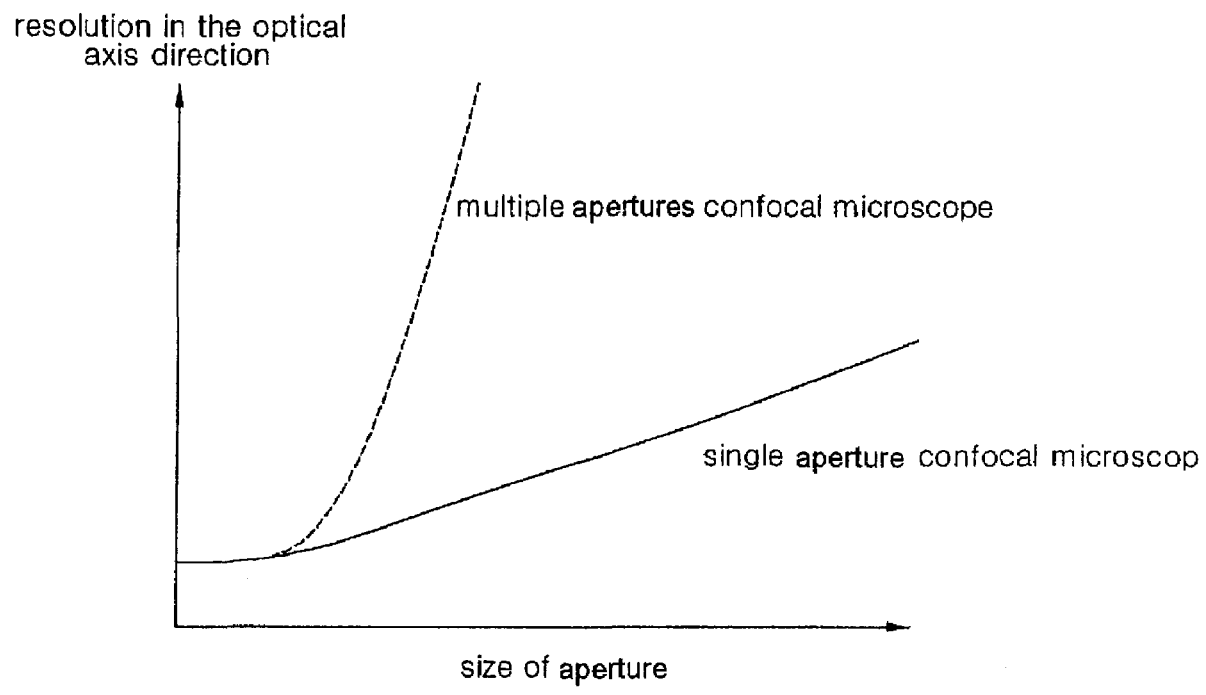
FIG. 5 is a graphic view for showing changes of the resolution in the optical axis direction according to the increase of the size of the aperture with respect to the confocal scanning microscope using the multiple apertures and the confocal scanning microscope using a single aperture.
Figure 6:
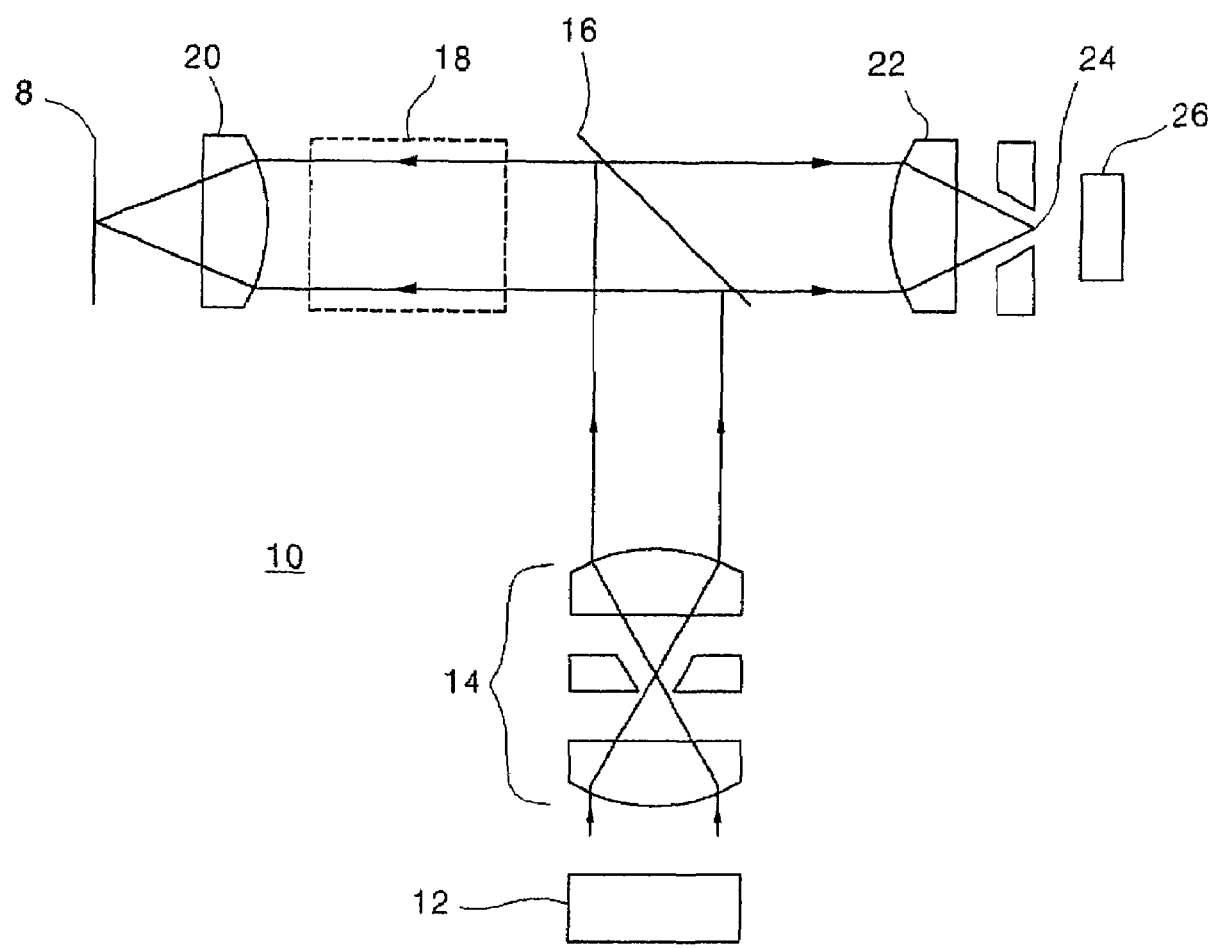
FIG. 6 is a schematic view of the conventional confocal scanning microscope using a beam deflector.
Figure 7:
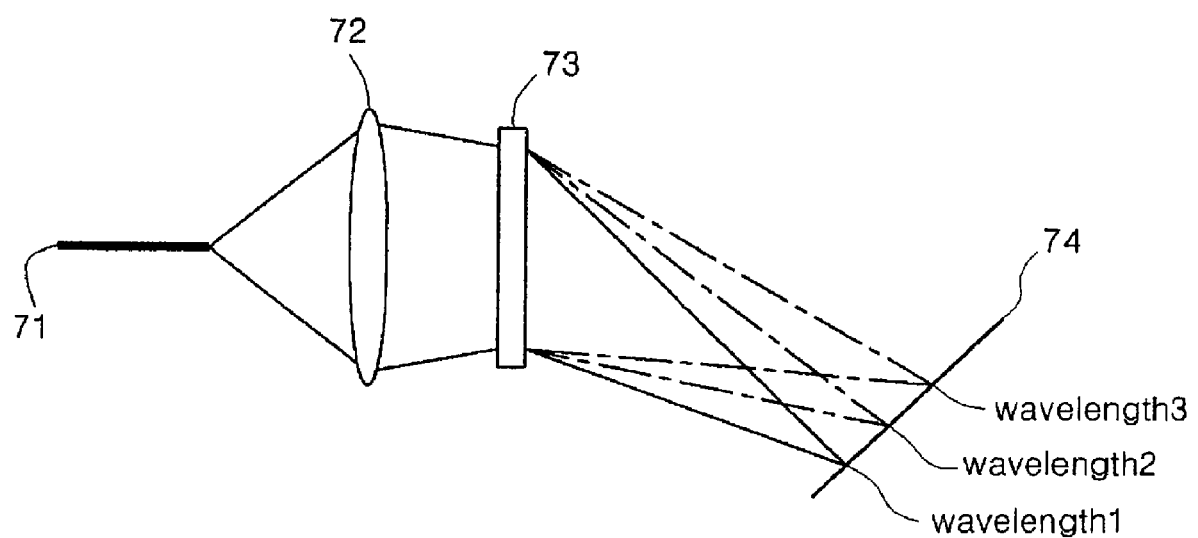
FIG. 7 is a schematic view of the conventional confocal scanning microscope spectrally encoded in one axis.
Figure 8:
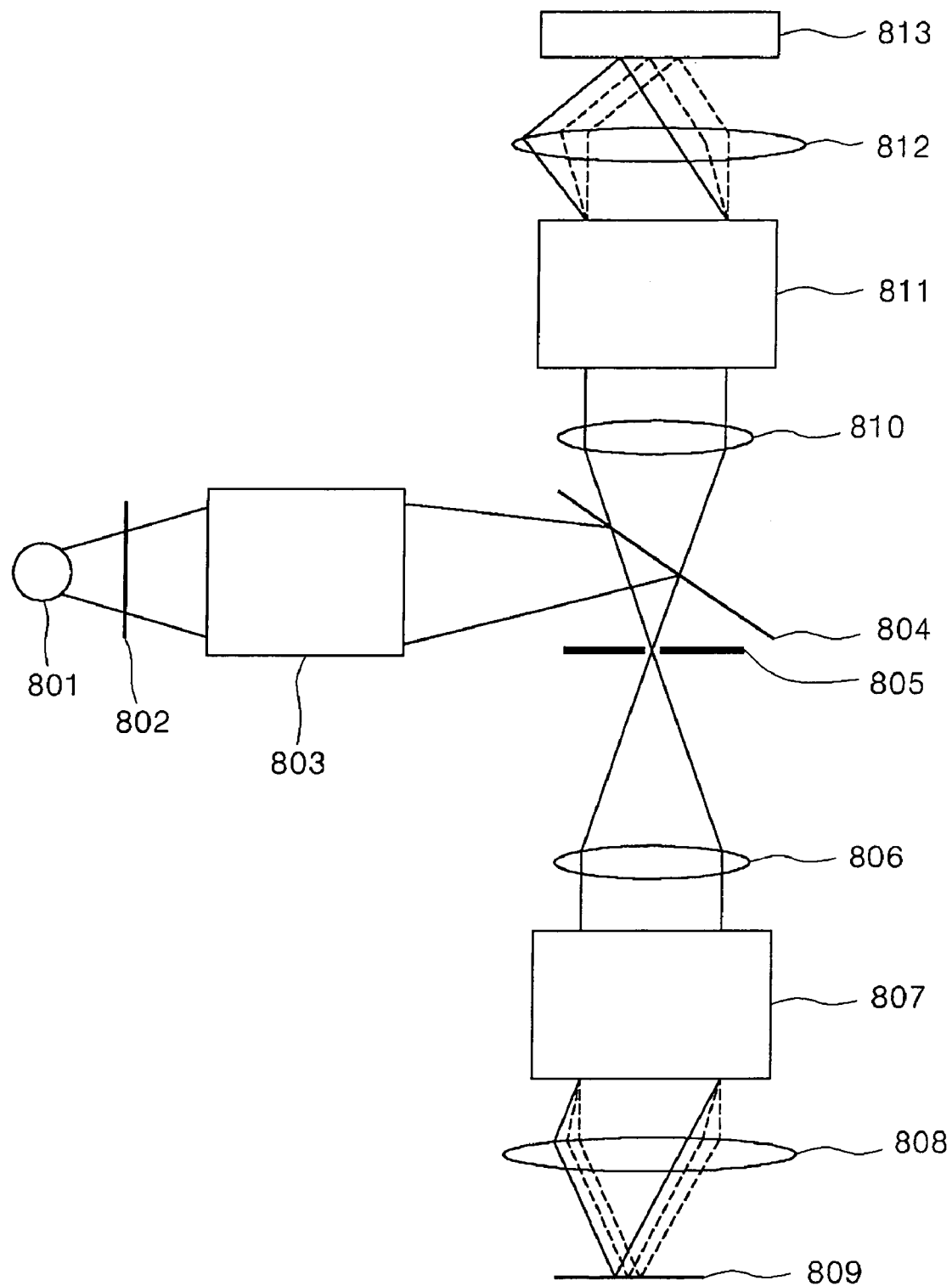
FIG. 8 is a view for showing the first embodiment of the present invention.

FIG. 8 is a schematic view of the confocal scanning microscope according to the embodiment of the present invention. As shown in FIG. 8, the microscope of the present invention comprises a broad band light source 801, a spectral filter 802, an illuminating optics 803, a beam splitter 804, a slit aperture 805, a tube lens 806, a first dispersion optics 807, an objective lens 808, a first image formation lens 810, a second image formation lens 812, a second dispersion optics 811, and a two dimensional photoelectric detector 813.

In the above structure, the light emitted from the broad band light source 801 becomes to be narrow in the range of the wavelength when it passes through the spectral filter 802. If the range of the wavelength is too big, a chromatic aberration will be produced with respect to the lights of diverse wavelengths. If the range of the wavelength in the broad band light source 801 is small, the spectral filter cannot be used to improve the photo efficiency.

When the light passes through the spectral filter 802, it is collected on the slit aperture 805 by the illuminating optics 803. When the light passes through the slit aperture 805, it propagates as if every point is a point light source by means of the diffraction of the light. The tube lens 806 separated from the slit aperture 805 by a focal distance, acts to make the lights passed through the slit aperture to be parallel lights propagating in diverse angles in a direction vertical to the ground shown in FIG. 8.

Figure 9:
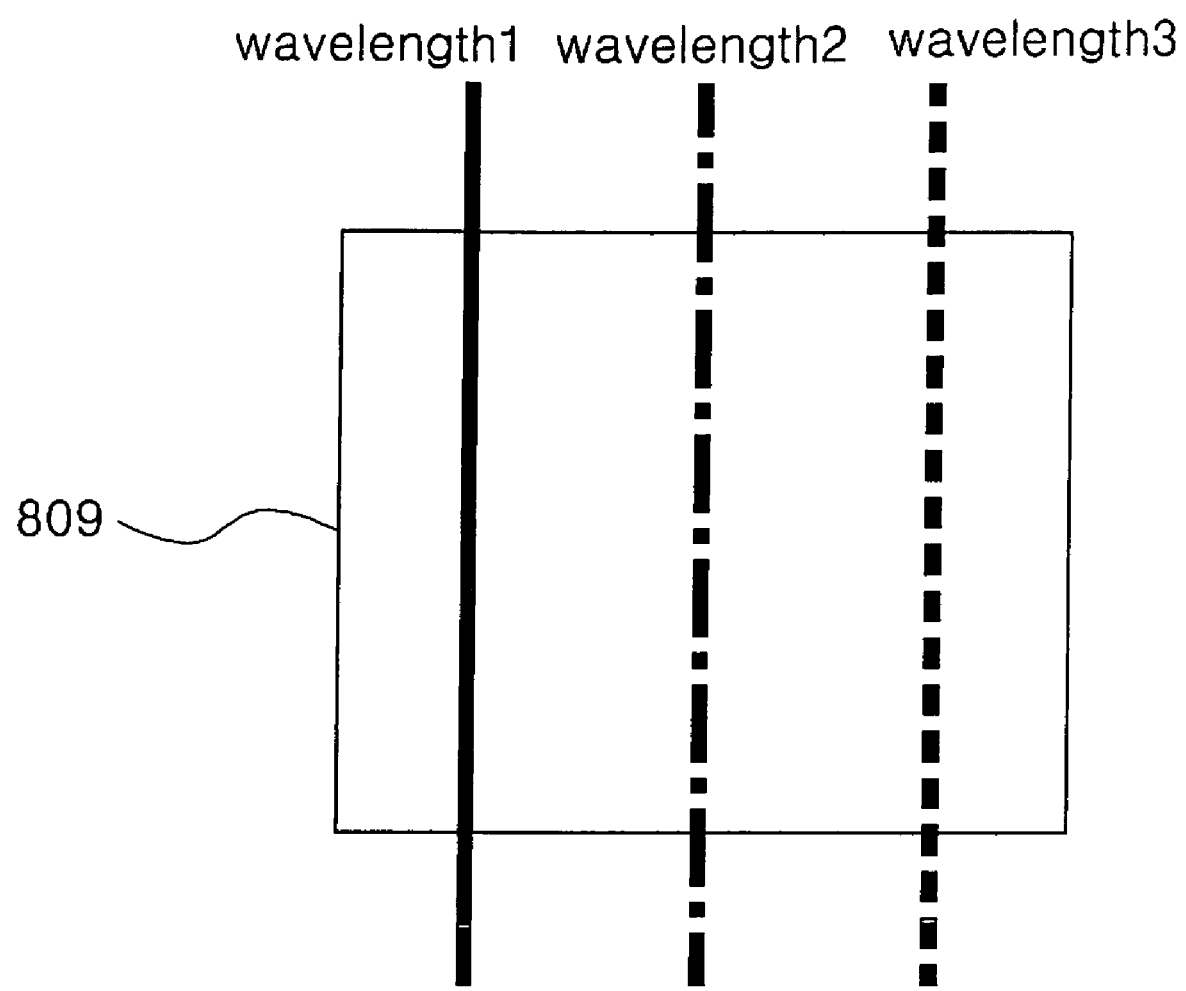
FIG. 9 is a schematic view for showing an illuminated shape of the specimen.

The bundle of parallel lights becomes to enter into the first dispersion optics 807. The first dispersion optics 807 acts as an optics making the lights propagate in angles different from each other according to their wavelengths. As the lights entering into the first dispersion optics 807 have diverse wavelengths, lights of different wavelengths are dispersed to propagate in different angles. The dispersed lights are focused on the specimen by the objective lens 808, the illuminating pattern of the specimen at this time is shown in FIG. 9. The light of a special wavelength is illuminated on the specimen as the slit shape, and lights of respective different wavelengths illuminate regions different from each other as slit shape in a direction vertical to the longitudinal direction of the slit. Thus, the present invention is featured that the two dimensional region of the specimen can be illuminated at one time.

The lights reflected from the specimen are combined into one with passing through the objective lens 808 and the first dispersion optics 807 and collected on the slit aperture 805 by means of the tube lens 806. In this instance, the reflected lights pass through the slit aperture 805 only when the specimen is positioned on the focal plane of the objective lens 808, and when the specimen is positioned above or below the focal plane, most of the reflected lights removed by the slit aperture

805. When the lights pass through the slit, they become to be a bundle of parallel lights by the first image formation lens 810 again, and enter into the second dispersion optics 811 to thereby diverge in a direction parallel to the ground according to the wavelength. The diverged lights form an image on the two dimensional photoelectric detector 813 by means of the second image formation lens 812. If a mirror is used as the specimen and the specimen is positioned on the focal plane of the objective lens, the observed image on the two-dimensional photoelectric detector 813 will have a shape similar to the illuminating pattern shown in FIG. 9.

Figure 10A:
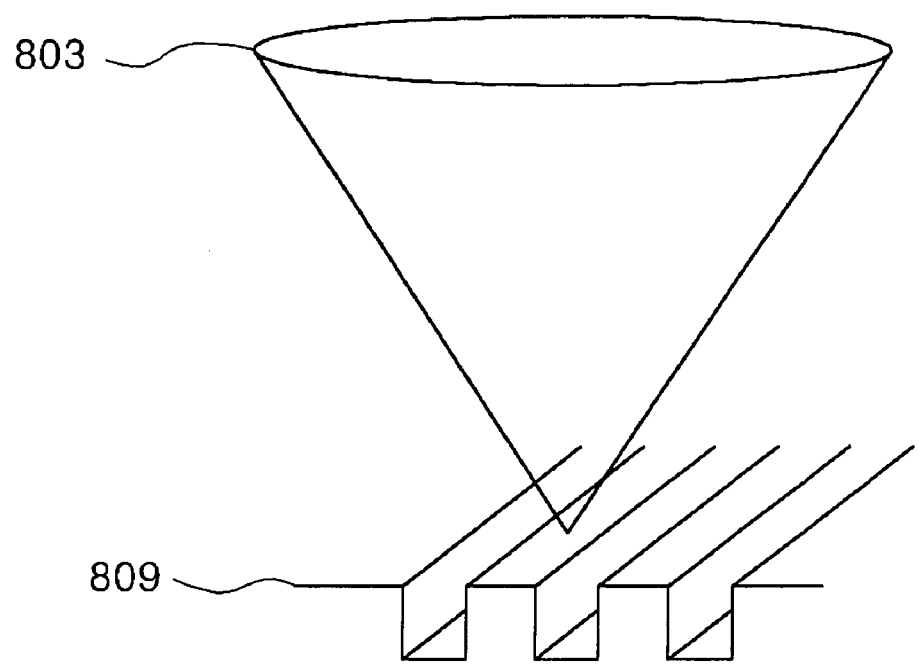
FIGS. 10a, 10b, 10c are schematic views for showing the illuminated shape of the specimen in case of observing the specimen in real, and showing a shape observed at the two dimensional photoelectric detector.
Figure 10B:
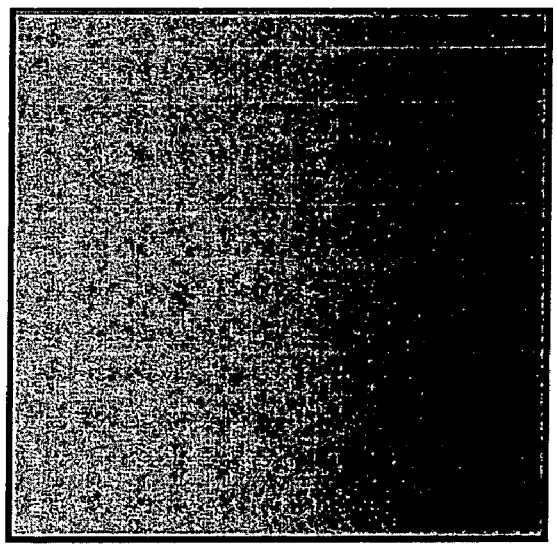
Figure 10C:
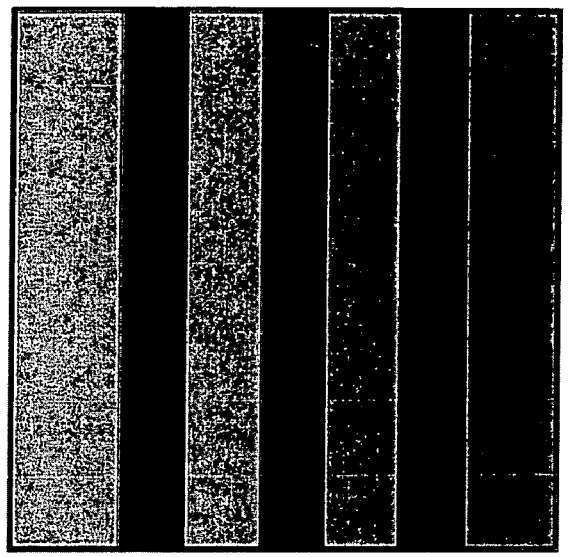

FIGS. 10*a* through 10*c* show images observed on the illuminating region visible at the time of observing the general specimen and on the two dimensional photoelectric detector. If an upper surface of the specimen having a height difference is positioned on the focal plane of the objective lens 808 as shown in FIG. 10*a*, signals reflected from a lower surface of the specimen are removed by the slit aperture to make the intensity of light be very weak. In this instance, the light patterns illuminated on the specimen are as shown in FIG. 10*b*. Accordingly, it is possible to observe the image shown in FIG. 10*c* on the two dimensional photoelectric detector 813.

Thus, according to the present embodiment, it is possible to obtain the image of the specimen without any scanning device to thereby make the structure thereof simple and to reduce cost and time required to process signals. Also, while it is possible to use it as the conventional general optical microscope, it is advantageous that it can obtain image having a higher resolution than the conventional optical microscope.

In addition, the first dispersion optics 807, which can propagate the lights in different angles respectively according to the wavelengths thereof, can be realized in various ways.

Figure 11:
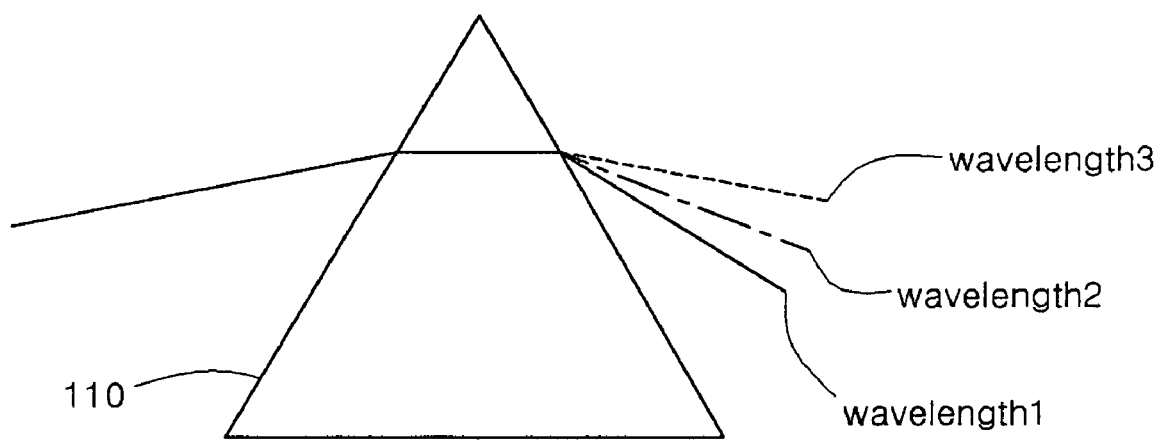
FIG. 11 is a schematic view for showing the dispersion of the light in a prism.

FIG. 11 shows an example of the first dispersion optics 807 constructed of a prism 110. As shown in FIG. 11, when a light is entered, it leaves the dispersion optics after it is diverged into various angles. This is because the refractive index of the material constituting the prism 110 becomes to be different according to the wavelengths to thereby produce differences in the refraction angles.

Figure 12:
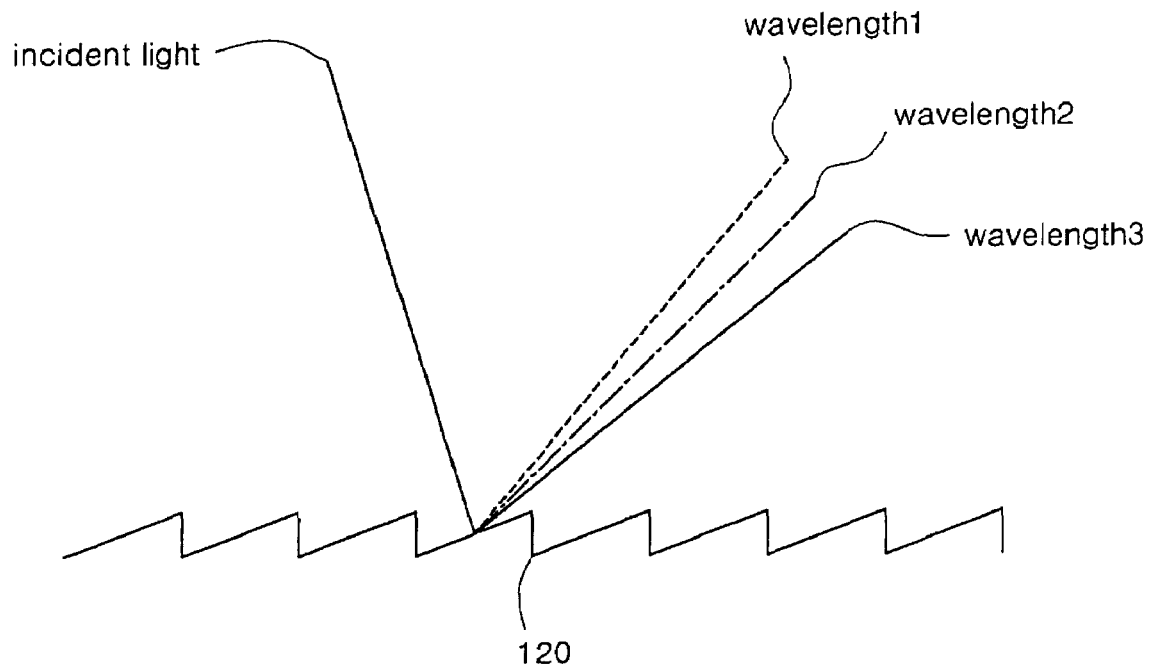
FIG. 12 is a schematic view for showing the dispersion of light in a diffraction grating.

FIG. 12 is an example of the dispersion optics constructed by using a diffraction grating 120. As shown in FIG. 12, when one light is entered, it is diverged into various angles to leave according to the wavelengths thereof. If the grating produces diffraction of the light, the propagating angle of the first-order light is in proportion to the size of the wavelength so that lights of different wavelengths propagate in different directions.

Figure 13:
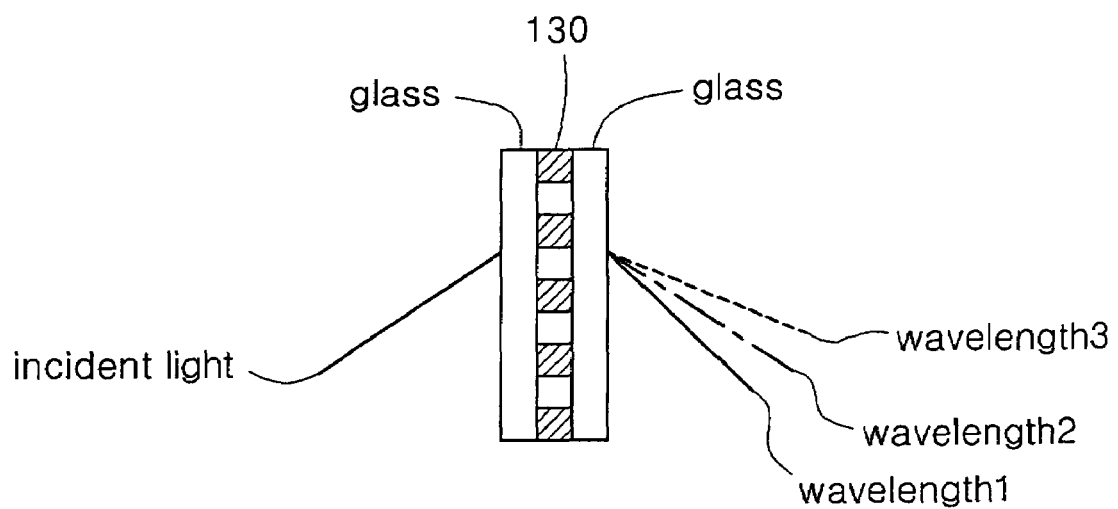
FIG. 13 is a schematic view for showing the dispersion of light in a VPH grating.

FIG. 13 is an example of the dispersion optics constructed of a VPH (Volume Phase Holographic) grating 130. The VPH diffraction grating is a diffraction grating made by using the volume hologram, and it maximizes the efficiency of the first light. In case of the prism, as the divergence of the angle is not great according to the wavelength, it is necessary to provide a light source having a very broad wavelength so as to illuminate a broad region of the specimen. However, if the region of the wavelength is too broad, chromatic aberration will be produced. In case of the conventional diffraction grating, it is possible to increase the divergence of the first light by reducing the pitch of the diffraction gratings, however, there is a defect that the efficiency of the first light will be decreased. Accordingly, in case of the VPH grating, there occurs an advantage that the efficiency of the first light has been increased with increasing the change of the angles according to the change of the wavelengths.

Figure 14:
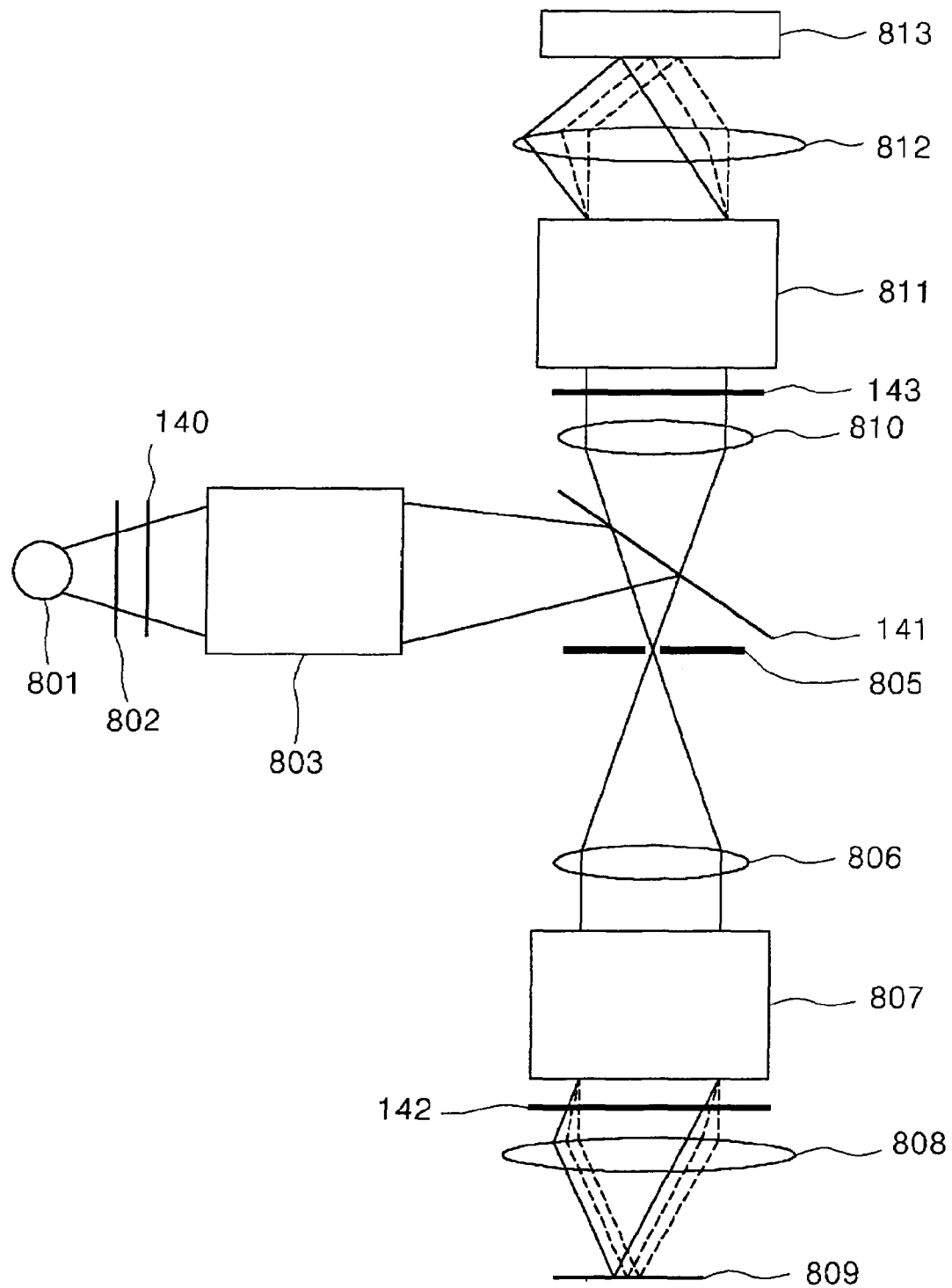
FIG. 14 is a view showing the second embodiment of the present invention.

FIG. 14 is a view showing another embodiment of the present invention. In FIG. 14, identical numerals are used to the same or equal elements. In FIG. 14, the microscope is featured that, a first polarizing plate 140 is installed between the spectral filter 802 and the illuminating optics 803, a polarizing beam splitter 804 is used instead of the beam splitter, a waveplate 142 is installed between the first dispersion optics 807 and the objective lens 808, and a second polarizing plate 143 is installed between the first image formation lens 810 and the second dispersion optics 811.

According to the present embodiment, the lights reflected from the slit aperture 805 without passing through it are hindered from being detected by the two dimensional photoelectric detector 813 by polarizing the lights entering into the slit aperture 805. Because the lights reflected from the slit aperture 805 have a polarizing state identical with that of the entered lights to thereby be reflected without passing through the polarizing beam splitter 141. Accordingly, the lights reflected from the surface of the slit aperture 805 do not be detected by the two dimensional photoelectric detector 813.

Therefore, the light illuminated on the specimen 809 and reflected after passing through the slit aperture 805, the tube lens 806, the first dispersion optics 807, and the objective lens 808 becomes to pass through the waveplate twice, so that it passes through the slit aperture and the polarizing beam splitter 141 without being reflected to be detected at the two dimensional photoelectric detector 813. The present embodiment can reduce the effect of the intricate lights reflected by the reflection surface of the plane of the slit aperture, and several kinds of optical parts to thereby improve the ratio of signal to noise.

Figure 15:
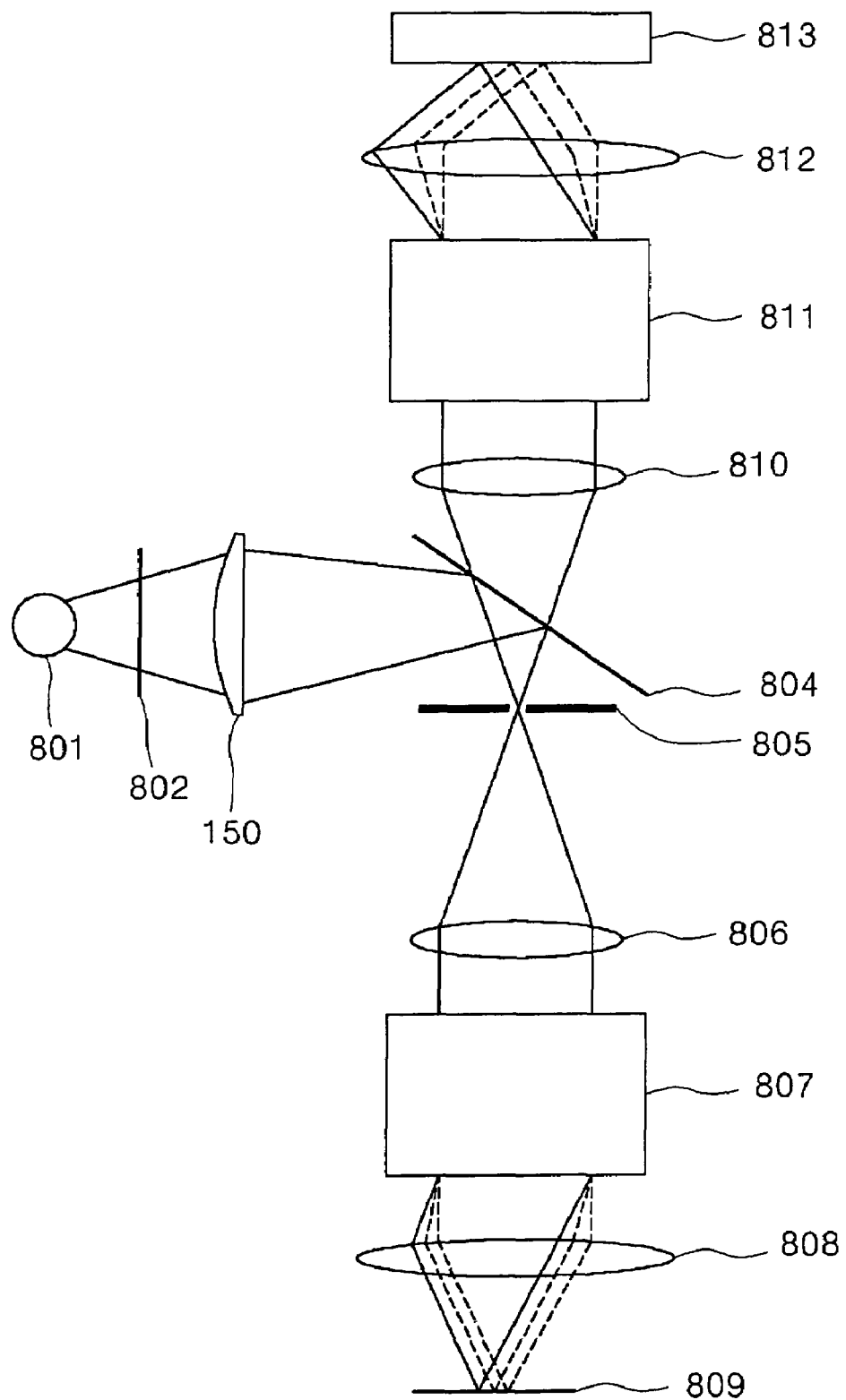
FIG. 15 is a view showing the third embodiment of the present invention.

FIG. 15 is a view showing still another embodiment of the present invention, which is featured that the illuminating optics is constructed of a cylindrical lens 150. In case of collecting the light emitted from the light source by using the cylindrical lens 150, the light collecting effect will be produced in only one direction so that the light has a slit shape at the collected portion. In case of illuminating the light on the slit aperture 805, it is possible to reduce the amount of light reflected and incapable of passing through the slit aperture to thereby improve the efficiency of the light and prevent the reduction of the quality of the image due to the reflected light.

Figure 16:
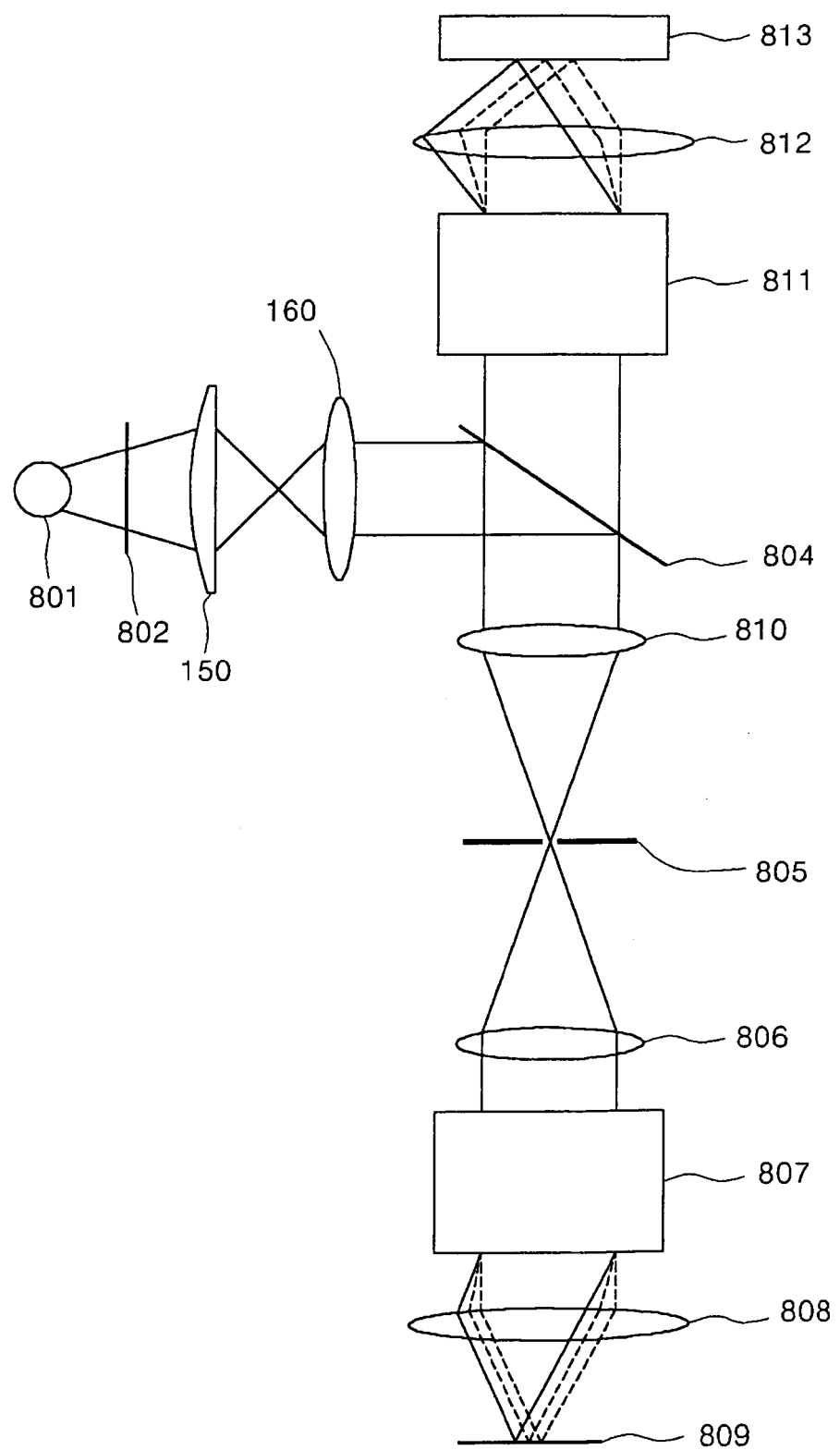
FIG. 16 is a view showing the fourth embodiment of the present invention.

FIG. 16 is a view showing still another embodiment of the present invention, which is featured that the illuminating optics is constructed of the cylindrical lens 150, an illuminating lens 160, and a first image formation lens 810.

Accordingly, this embodiment employs the manner of image formation, in which the light collected as the slit shape by the cylindrical lens 150 is image formed on the slit aperture 805 by using the illuminating lens 160 and the first image formation lens 810. In this instance, the lights passed through the illuminating lens 160 form a bundle of parallel lights having different propagating directions, and they are image formed on the slit aperture 805 by the first image formation lens 810. In case of using such optics, because the lights passed the beam splitter 804 are become to be parallel lights, so that it is possible to remove the chromate aberration produced at the time of a converging light or a diverging light.

Figure 17:
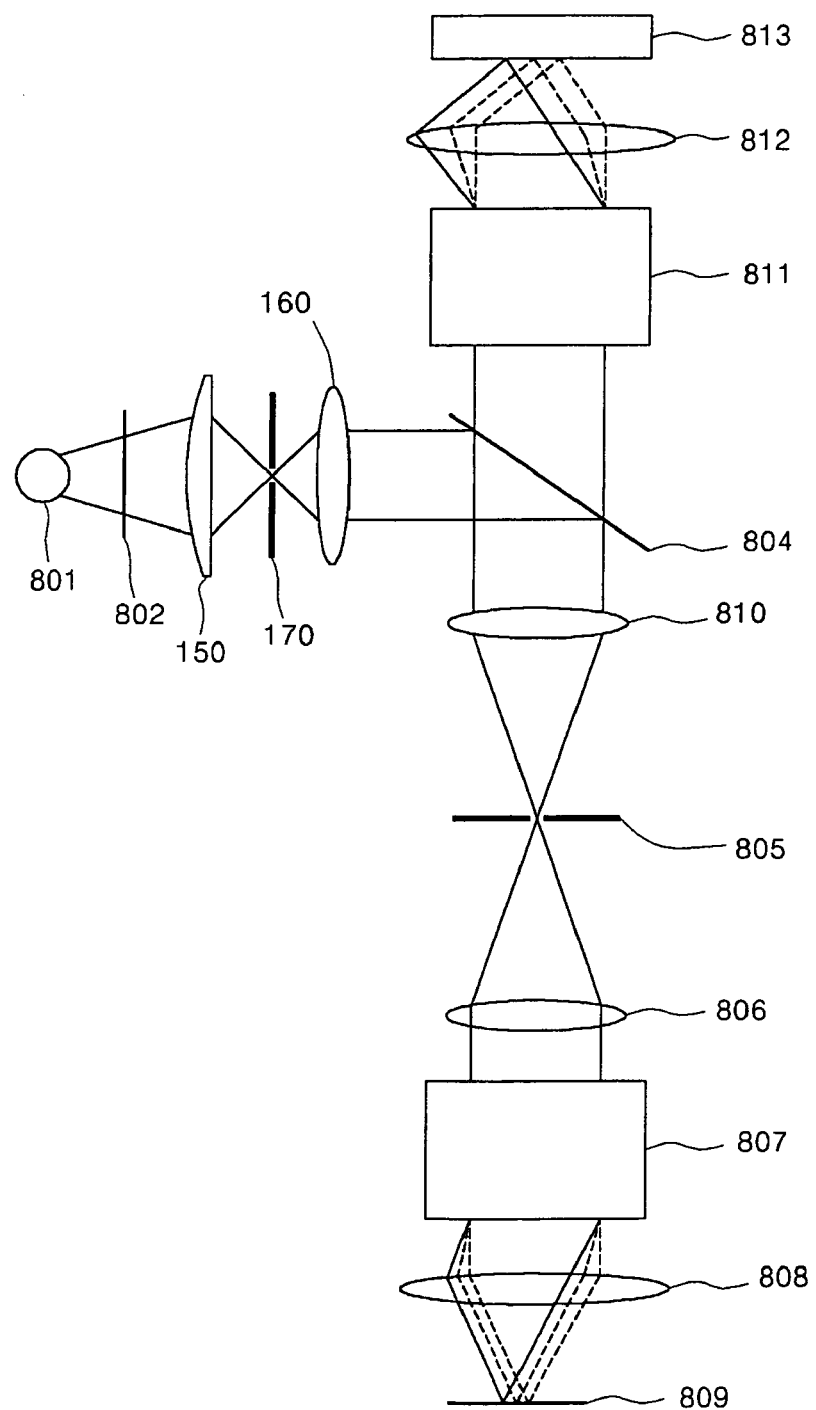
FIG. 17 is a view showing the fifth embodiment of the present invention.

FIG. 17 is a view showing another embodiment of the present invention, in which the illuminating optics is characterized by comprising a cylindrical lens 150, a second slit aperture 170, an illuminating lens 160, and a first image formation lens 810.

Accordingly, among the lights collected as the slit shape by the cylindrical lens 150, the lights passed through the second slit aperture 170 are illuminated on the slit aperture 805 after passing through the illuminating lens 160 and the first image formation lens 810. Because only the lights passed through the second slit aperture 170 are illuminated on the slit aperture to thereby remove the lights reflected on the slit aperture to prevent the decreasing of the quality of the image by the stray lights.

As described above, while the present invention has been described with reference to the particular illustrative embodiments, it is not to be restricted by the embodiments but only by the appended claims. It is to be appreciated that those skilled in the art can change or modify the embodiments without departing from the scope of the appended claims and spirit of the present invention.

As described above, according to the real time confocal microscope using the dispersion optics of the present invention, several advantages can be obtained by constructing the confocal microscope without the scanning device as follows: (1) it is possible to settle the problem of vibration produced from the scanning device, (2) it is possible to decrease the production cost of the measuring device by removing the high cost beam deflection device and the signal processing device, (3) it is possible to obtain the image at high speed because there is no time delay due to the processing of the signals, and (4) it is easy to make the dispersion optics compact because there is no scanning device.

As a result, the present invention can be applied to the inspection process of the semiconductor fabrication line requiring the measurement of a high resolution at high speed, and to the inspection process in the LCD fabrication line, and the like. In such case, (a) it is possible to reduce the production cost and the production time, and (b) it is possible to improve the quality of the higher value added product by the whole inspections. (c) Further, it can be applied widely to the observation of the inaccessible place by making it compact.

What is claimed is:

1. A real time confocal microscope using a dispersion optics comprising:
    a broad band light source for supplying light;
    an illumination optics for illuminating onto a slit aperture by collecting the light emitted from the light source;
    the slit aperture for only passing a region of the slit among the light illuminated from the illuminating optics;
    a tube lens for making the lights passing though the slit aperture to be parallel lights;
    a first dispersion optics for making the parallel lights emitted from the tube lens propagate in different angles according to wavelengths;
    an objective lens for illuminating the lights emitted from the first dispersion optics on a specimen;
    a first image formation lens for making the lights reflected from the specimen and passing through the slit aperture to be parallel lights;
    a second dispersion optics for making the parallel lights emitted from the first image formation lens propagate in different angles according to wavelengths;
    a second image formation lens for image forming the lights emitted from the second dispersion optics; and
    a two dimensional photoelectric detector for converting the lights emitted from the second image formation lens into an electric signal.

2. The real time confocal microscope according to claim 1, wherein the first and the second dispersion optics are formed of a prism.

3. The real time confocal microscope according to claim 1, wherein the first and the second dispersion optics are formed of a diffraction grating.

4. The real time confocal microscope according to claim 1, further comprising:
    a first polarizing plate arranged between the broad band light source and the illuminating optics;
    a waveplate arranged between the first dispersion optics and the objective lens;
    a second polarizing plate arranged between the first image formation lens and the second dispersion optics; and
    a polarizing beam splitter for splitting the lights illuminated from the illuminating optics into the slit aperture and the first image formation lens, respectively.

5. The real time confocal microscope according to claim 1, wherein the illuminating optics is formed of a cylindrical lens.

6. The real time confocal microscope according to claim 1, wherein the illuminating optics comprises:
    a cylindrical lens for collecting the lights;
    an illuminating lens for making slit patterns collected by the cylindrical lens into parallel lights; and
    an image formation lens for collecting the parallel lights emitted from the illuminating lens on the slit aperture.

7. The real time confocal microscope according to claim 6, further comprising a second slit aperture arranged between the cylindrical lens and the illuminating lens for filtering the lights collected by the cylindrical lens.

* * * * *